Nov. 23, 1937.   H. F. HOBBS   2,100,251
AUTOMATICALLY VARIABLE POWER TRANSMISSION MECHANISM
Filed Jan. 23, 1936   6 Sheets—Sheet 1
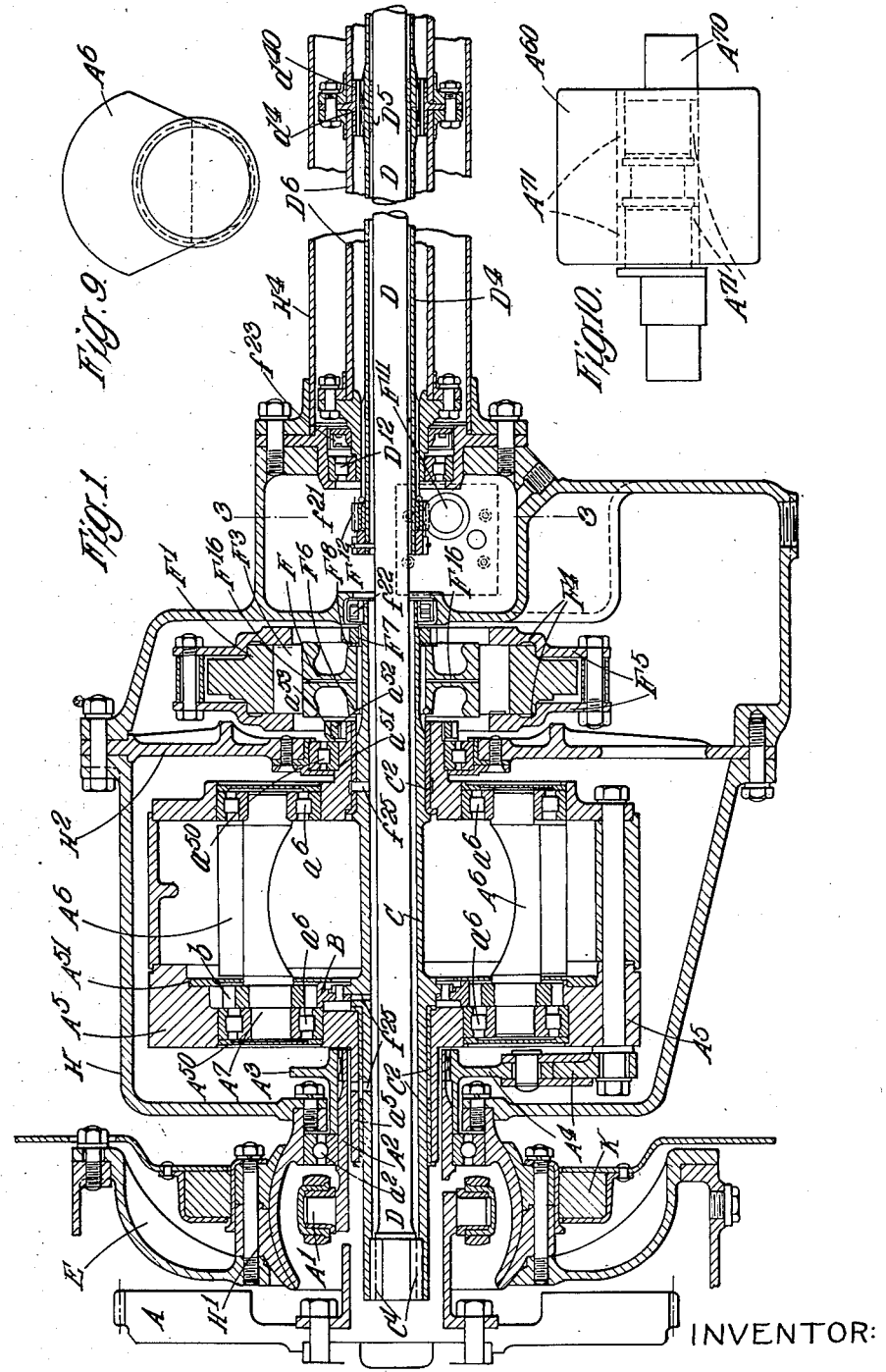
INVENTOR:
HOWARD FREDERICK HOBBS
BY Haseltine, Lake & Co.
ATTORNEYS

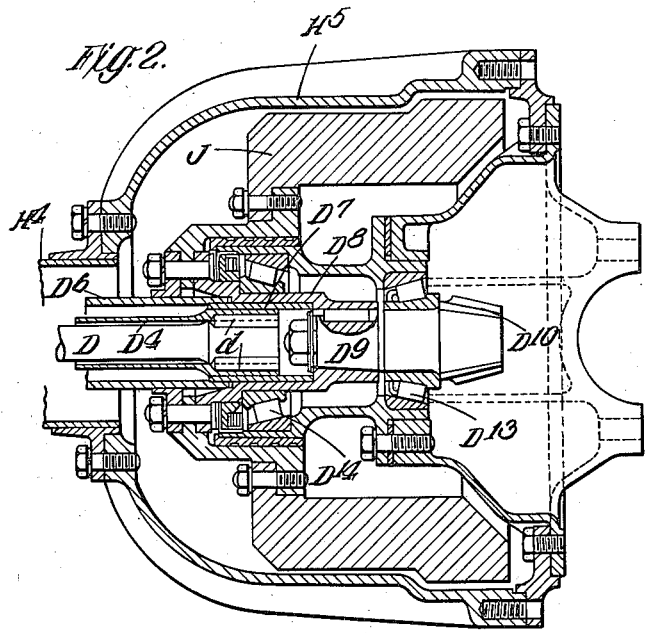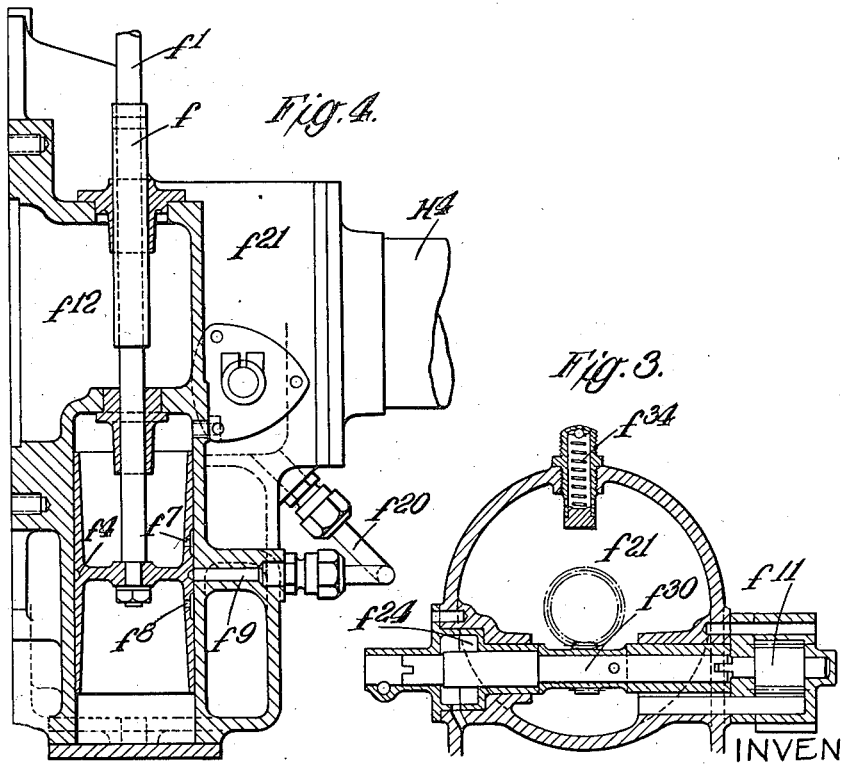

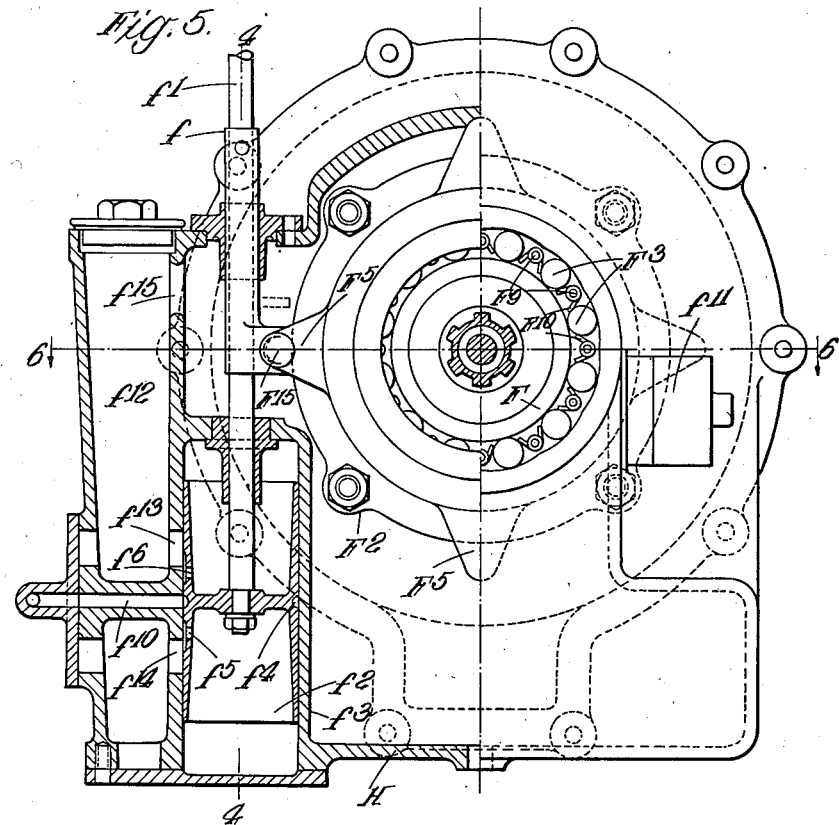
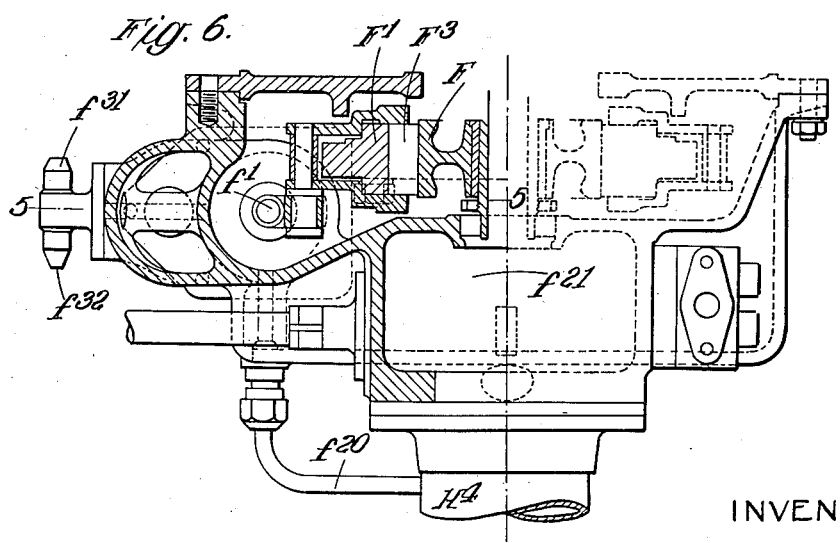

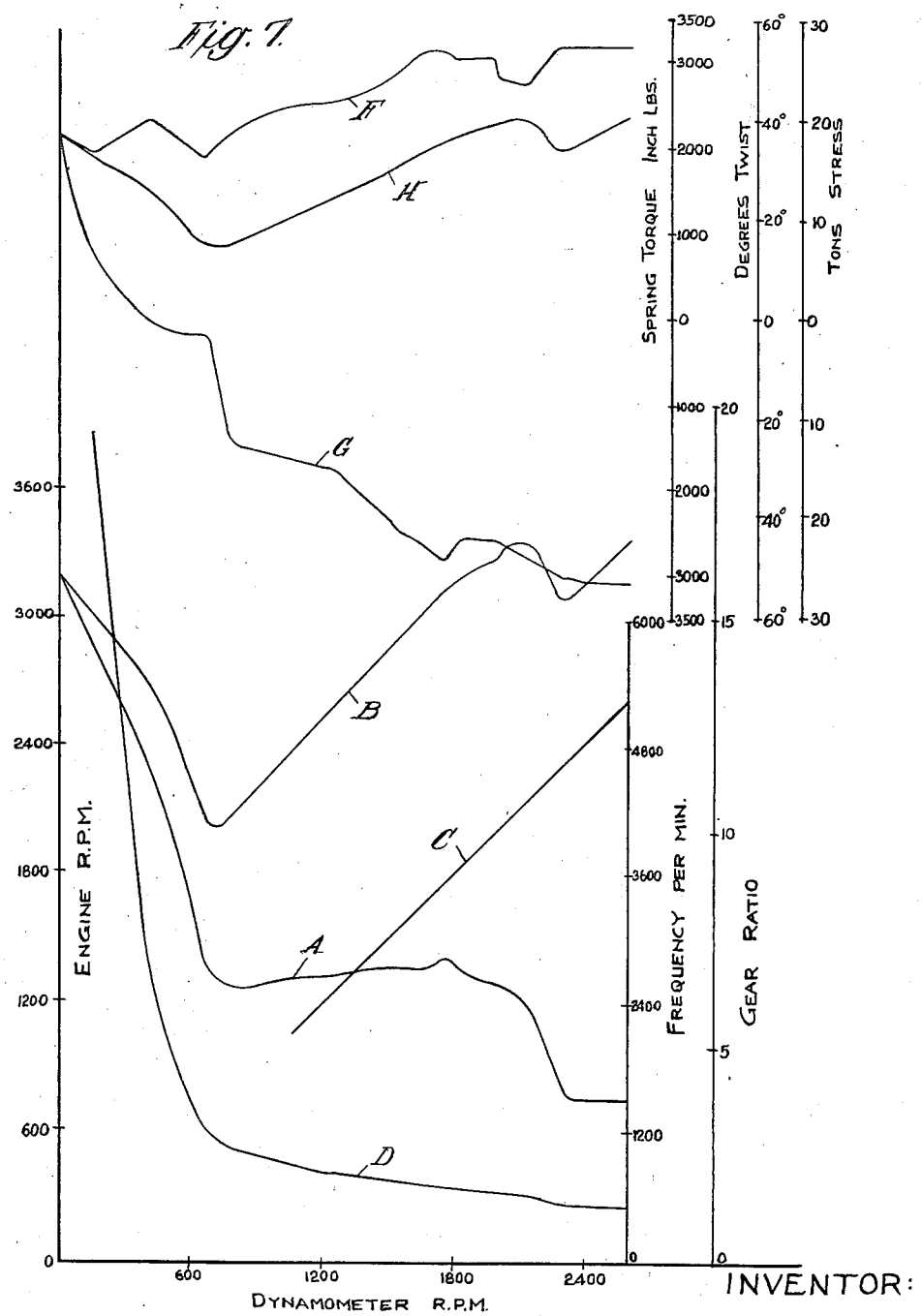

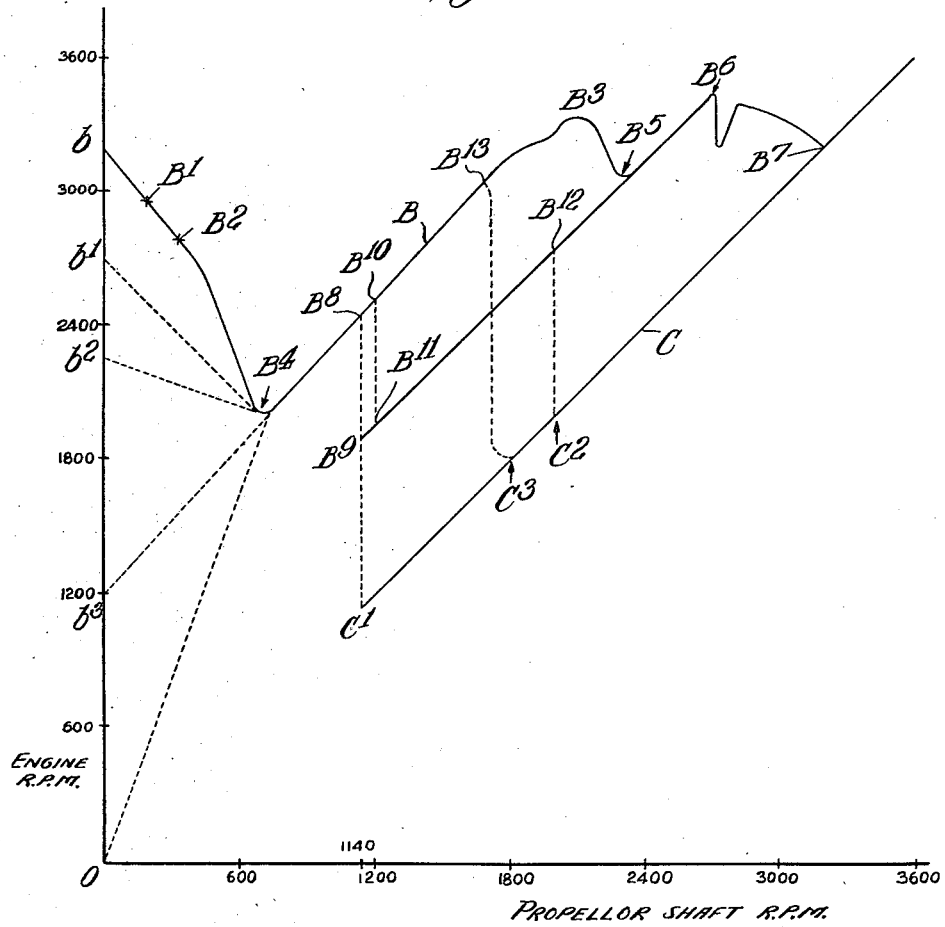

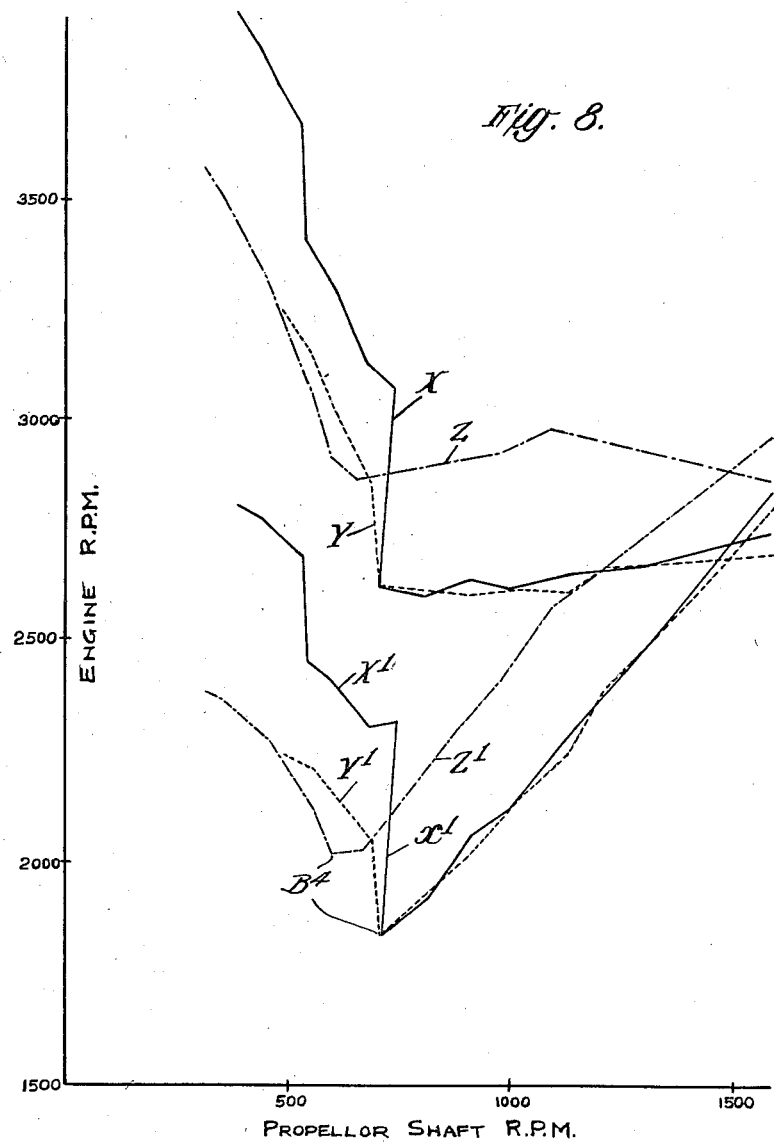

Patented Nov. 23, 1937

2,100,251

UNITED STATES PATENT OFFICE 2,100,251

AUTOMATICALLY VARIABLE POWER TRANSMISSION MECHANISM

Howard Frederick Hobbs, Leamington Spa, England

Application January 23, 1936, Serial No. 60,471
In Great Britain December 29, 1933

5 Claims. (Cl. 74—260)

This invention relates to automatically-variable power transmission mechanism of the kind (of which an example is disclosed in the specification of my prior British Patent No. 358,732) comprising at least one set of planetary weights carried by the engine crankshaft or other driver shaft, the weights being connected (preferably by planet pinion and a sun wheel) to an intermediate means which is prevented from rotating other than in the desired direction (preferably by a roller detent device) and which is connected to a driven member (e. g., the tail shaft of a motor propelled road vehicle) by a resilient device. The invention will hereinafter be described to facilitate explanation as applied to a gear having a single set of weights but I wish it to be understood that the invention is applicable to a gear having more than one set of weights. The term "tail shaft" hereinafter employed is intended to include any driven member such as the bevel pinion driving the differential bevel gear wheel.

Whilst this gear has given satisfactory service I have during the course of numerous bench and road tests with the aforesaid gear and with more recent gears made certain discoveries which I have utilized in the present invention by providing a gear giving still better performance.

From various tests and graphs prepared from the results the following features have become evident:—

The operation of the gear of the present invention may be divided into at least four distinct methods of operating which I will describe as "first phase", "second phase", "third phase" and "fourth phase". A relatively unimportant "fifth phase" will also be referred to.

The "first phase" of the gear comprises the period from the starting of the engine up to a slow driving or tail shaft speed in which the frequency of impulses from the weights is asynchronous with respect to the natural frequency of oscillation of the system comprising the weights, bearings, pinions, sun wheel, intermediate shaft, inner detent member, and spring, as a whole. The impulses of the weights will however synchronize with the oscillations of said system at a higher frequency; the weights will force the system into the higher frequency of said impulses. In this first phase the engine speed may vary from nought to the maximum and the tail shaft speed may vary between nought and a fairly low driving speed. The action of the gear will be such that a positive or driving twist always exists on the spring shaft (i. e. the tail shaft does not overrun the spring shaft to provide a negative torque or twist in the opposite direction) and the sun wheel and intermediate means will be stationary momentarily during each rotation of the weights about the axes of the pinions and the inner detent member will constantly oscillate first forwards and then backwards against the outer detent member. The weights force the oscillating parts into a frequency other than the natural frequency. This phase is probably not used more than about one per cent of the total driving period.

The "second phase" constitutes the major part of the driving period other than top gear (i. e. one-to-one gear or direct drive) and may be in the region of say 8 per cent. of the total driving period. I have discovered that the gear has a very marked tendency to operate at the natural frequency of said system when each driving impulse of the weights synchronizes with the natural forward or positive direction of movement of the sun wheel. When this synchronization occurs or is nearly approached second phase will occur unless third or fourth phase is reached. When constant frequency is reached the engine speed will increase as will be more fully described hereinafter. In this phase the difference between the engine and driven shaft speeds is constant.

In "first phase" engine speed at full throttle increases as tail shaft speed decreases and vice versa, but during second phase tail shaft speed increases with increase of engine speed. Therefore as tail shaft speed decreases in second phase engine speed will decrease, but when maximum torque speed is reached further decrease in tail shaft speed must not be accompanied by decrease in engine speed and therefore the gear must be arranged to go into first phase whereupon the engine speed can then increase rapidly with decrease in tail shaft speed.

"Third phase" can be produced at fairly high tail shaft speeds. In this phase the frequency of impulses from the weights is nearly down to half the natural frequency of oscillation of the system referred to so that the impulses still substantially synchronize but the engine speed will be lower thus keeping engine speed within the desired limits. "Third phase" can be produced by decreasing engine speed at high tail shaft speed.

The "fourth phase" comprises top gear or one-to-one ratio drive when the planetary weights remain in their driving positions and cease to rotate around the axes of the pinions.

A "fifth phase" is obtainable at very high speeds when the weights operate on one fourth of the frequency of the oscillating system. This phase is however comparatively unimportant as it only occurs well above normal speeds.

The gears illustrated in specification No. 358,732 had first, second, and fourth phase actions but no third or fifth phase, and the natural frequency of the spring system was so low that the lowest engine speed in second phase at full throttle was far below maximum torque speed.

The period just prior to the gear entering "second phase" from "first phase" is of great importance as at this period the inertia of the intermediate means and parts affecting its inertia including the inner detent member, the planetary weights and the forward part of the resilient device, is at its maximum for "first phase" and this inertia counteracts the tendency of the weights to force these parts into their own frequency of rotation (other than the natural frequency) or in other words tends to prevent the gear from reaching second phase.

If this inertia is sufficiently high the gear will not enter "second phase" (unless for example it is speeded up by some other agency such as by running downhill or is working under no load) and a point of no drive is reached which I term a "flat spot" effect.

For example, if a longitudinally arranged helical spring is provided to serve as the spring shaft and is sufficiently large to take the load, stress, and frequency, the flat spot effect cannot be avoided.

If the inertia is low enough to avoid the flat spot effect it will still tend to produce roughness in transmission at this period. A gear as shown in Figures 1 to 8 of the drawings forming part of the specification of my said prior British patent will clearly avoid the flat spot trouble but some roughness has been experienced during the period referred to although this roughness is only momentary and does not often occur during actual driving.

An object of the present invention is to reduce or avoid the roughness referred to. Other important objects are to obtain satisfactory ranges of gear ratios and engine speeds with consequential improvement in efficiency and smoothness of transmission.

According to the invention the parts of the gear are all so constructed and arranged (in accordance with the particular engine and load conditions with which it is to be used) as to the design and mass of the weights, the frequency and inertia of the oscillating parts, and the ratio in the numbers of teeth in the pinions and sun-wheel or equivalent ratio, that (1) (a) the lowest second phase engine speed (at full throttle) is not appreciably below maximum torque speed, and (b) the lowest point in second phase at which third or fourth phase can be entered at full throttle is not above maximum horsepower speed of the said particular engine, so that the ratios between the engine and driven shaft speeds from a point in first phase near to the entry into second phase are in the known or standard ranges, (2) the inertial resistance of the oscillating system just prior to entering "second phase" is low enough (in relation to the total moment which the planetary masses can exert) to produce smooth entry into said "second phase", (3) the lowest top gear "fourth phase" speed is low enough to enable the total moment of the planetary weights to be high enough in relation to said inertial resistance to produce a smooth entry into "second phase" and (4) second phase tail shaft and engine speeds and the lowest top gear speed at full throttle are all so correlated as to avoid producing change in engine speeds or gear ratio on entering or leaving fourth phase greater than normally encountered in gear changing. Preferably the ratio between the pinions and sunwheel or equivalent is between 1:1.5 and 1:2.5; the natural frequency of the system comprising the resilient device, the intermediate means, and the parts affecting the frequency of said device and means is between 1700 and 3200 and preferably between 2300 and 3000; and the amount of inertia in lbs.—in.$^2$ of the intermediate means together with parts affecting its inertia with respect to the axis of said means does not exceed 0.6 (or preferably 0.5) of the maximum torque figure in ft.—lbs. which the planetary system would exert upon the intermediate means in top gear if the casing carrying the weights were rotating at 1400 R. P. M.

The desirable engine speeds vary with different engines (but not greatly as far as normal vehicle engines are concerned) and for any particular engine for satisfactory efficiency the gear under full throttle conditions should maintain the engine speeds within the speed giving maximum torque and the speed giving maximum horsepower. With a standard 7 H. P. engine these speeds are roughly 1,800 to 3,000 respectively but other engines are capable of higher speeds. The gear must be constructed so that the engine speed will practically always be maintained approximately between maximum torque speed and maximum horsepower speed. The gear will be arranged so that the lowest second phase engine speed (at full throttle) is not below or appreciably below maximum torque speed—certainly not more than 10% lower than maximum torque speed. This can be effected mainly by employing a suitable sun wheel and pinion ratio and a suitable spring shaft or other resilient device so as to give the required natural frequency of the oscillating system. The frequency and sunwheel and pinion ratio are selected in relation to each other and to the engine so that the gear ratio varies in such a way as to maintain this range of engine speeds and to give the desired gear ratios at different speeds.

The necessary gear transmission ratios can be determined empirically by well known methods but for certain motor vehicles are fairly well known.

In second phase (and in first, third, and fifth phases) the frequency is equal to the product of the ratio between the sun and pinion wheels and the difference between the engine and tail shaft speeds and in second phase this frequency is equal to the natural frequency of the spring system. Thus $F=R(E-T)$, where F=frequency, R=ratio between the sunwheel and pinions, E=engine speed, and T=tailshaft speed. It is found that if the inertia of the system and the moment of the planetary weights are correct the speed of the tailshaft at which first phase merges into second phase is about 600–700 R. P. M. and variation of natural frequency and ratio of sunwheel and pinions does not alter this speed to any appreciable extent. Thus from the equation $F=R(E-T)$ it will be obvious that by varying F and R the lowest engine speed at full throttle in second phase can be selected at any required value. In order that the engine speed shall not exceed maximum horse power speed it must be possible to enter third or fourth phase at least when the engine reaches maximum horse power speed in second phase or in other words the lowest point in second phase at which third or fourth phase can be entered must not be above maximum horse power speed. Thus whilst F and R are selected to avoid engine speed falling appreciably below maximum torque speed, these factors are at the same time selected to avoid bringing the said point above maximum horse power speed. In other words, variation of F and R will increase or decrease the range of engine speeds (other than in top gear) i. e., will move the full throttle engine speed curve bodily, so that F and R can be selected to increase the whole full throttle range until its lowest point is not appreciably lower than maximum torque speed and at the same time the F and R will not be varied too much in this direction, i. e., not enough to bring the said point above maximum horse power speed. It will be obvious that the range of speed can thus be moved nearer to maximum horse power speed if higher performance is required or nearer to maximum torque speed if greater economy is required. As is well known in the design of gear boxes a mean position is usually adopted. From the equation referred to above the following can also be derived:

$$\frac{E}{T} = \frac{F}{RT} + 1$$

Given the sunwheel and pinions ratio it will be obvious that the transmission ratio $$\left(\frac{E}{T}\right)$$

at any tailshaft speed varies with the frequency; or any desired transmission ratio can be obtained at any tailshaft speed by suitably selecting and co-relating the sunwheel and pinions ratio and the frequency. It is well known that the transmission ratios for orthodox gear boxes are selected so that the corresponding tractive effort or torque curves approach as nearly as possible to the ideal tractive effort curve in which horse power would be the same at all speeds. The curve of transmission ratios for the present invention can be selected by varying F and R so that the ratios produce a tractive effort curve which (as nearly as the shape of the curve permits) passes between the maximum performance parts and the maximum economy parts of the series of torque or tractive effort curves of the normal type of gear. If higher performance is desired the transmission ratios curve will be varied towards the high performance peaks of the curves, and if higher economy is desired the transmission ratios curve will be varied in the other direction towards the high economy parts of the normal curves. However for the purpose of the present invention this variation of the transmission ratios curve is settled automatically in a simple manner, viz., F and R are varied so that the engine speed curve or range (other than for top gear) is not appreciably below maximum torque speed and the lowest point in second phase at which third phase or fourth phase can be entered is not above maximum horse power speed, this curve or range being varied bodily within these limits according to the performance desired in relation to economy (all as hereinbefore explained): the transmission ratios curve is then simultaneously correctly positioned. For example with a sun and pinion ratio of 2:1 (which is preferable for several reasons) and a low frequency of 1000 the gear ratio at 1000 tailshaft revolutions per minute is 1:1.5; at 1500 revolutions, 1:1.33; and at 2000, 1:1.25; which ratios are too high and the corresponding engine speeds will be too low and the gear will tend to enter fourth phase when not desired. Conversely, a too high frequency will give too low gear ratios and too high engine speeds. Too high frequency will also produce an undesirably large difference of gear ratios when changing into or out of fourth phase and will tend to place too great a load and wear on the detent; I have found that a frequency of 2300-3000 revolutions per minute is most suitable although in special circumstances this may be varied.

I find that the sun wheel and pinion ratio should be from 1.5:1 to 2.5:1; a higher or lower ratio will produce undesirable gear ratios or too low or high frequency of the impulses of the weights. Preferably a 2:1 sun-wheel and pinion ratio is adopted as this also avoids wear on certain teeth where the direction of centrifugal torque is reversed and gives satisfactory frequency.

The planetary weights must be sufficiently heavy to transmit at the lowest full throttle top gear speed required the full engine torque developed at that speed. Whilst it is theoretically better to change into or out of top gear at maximum torque speed it is in practice more convenient to change at a much lower speed. This lowest top gear (fourth phase) speed should be low enough to suit the convenience of the average driver requiring to maintain top gear when slowing down for instance in traffic and a speed of about 14–18 M. P. H. (or say 1300 to 1700 revolutions per minute of the tail shaft) at full throttle is usually suitable depending upon the type of vehicle or the user's requirements. This top gear or fourth phase lowest speed should not be too low (and the weights must not be too heavy) as this would prevent the gear from leaving fourth phase when desired. This speed must however be high enough to avoid producing undesirable large change in gear ratio on entering or leaving fourth phase. The size of the planetary weights may be designed within fairly close limits to provide the required fourth phase lowest speed. Variation of the size of the weights alters the natural frequency of the oscillating system although not greatly and has comparatively little effect on first, second or third phase performance.

As already described the inertia of the oscillating system must be as low as possible consistent with strength and the inertia difficulty is greatest just when entering second phase action since at this moment the inertial resistance of the oscillating parts against entering second phase is at a maximum. This inertial resistance is related to the total maximum moment of driving torque which all of the planetary weights can exert on the sun wheel. If this moment is increased (e. g. by using heavier weights) the inertia problem is easier but increasing this moment will reduce the lowest speed at full throttle in fourth phase and other difficulties arise if this speed is too low. This speed must however be low enough to permit the said moment to be high enough to avoid roughness on entering second phase.

I have found that the moment of inertia in lbs.—in.$^2$ of the parts in question should not exceed 0.6 (or preferably 0.5) of the maximum torque figure in ft.—lbs. which the planetary system would exert upon the intermediate means in top gear if the casing carrying the weights were rotating at 1400 R. P. M. This inertia limit will vary accordingly for a gear having a different lowest direct speed drive but will probably in every case lie between 0.3 and 0.9. This inertia figure is inversely proportional to the square of this speed. Thus with a gear which was applied to an "Austin 7" engine the lowest top gear speed at full throttle was 1140 and the engine torque transmitted at this speed was 22 ft.—lbs. Therefore the planetary weights at 1400 R. P. M. would be capable of transmitting $$\frac{1400^2}{1140^2} \times 22 = 33 \text{ ft.—lbs.}$$

The permissible inertia is then $0.6 \times 33 = 19.8$ lbs.—in.$^2$ (or preferably $0.5 \times 33 = 16.5$ lbs.—in.$^2$).

With a gear applied to a "Rover 10" the weights transmitted 45 ft.—lbs. at 1400 R. P. M. and the inertia therefore must be less than $0.6 \times 45 = 27$ lbs.—in.$^2$ or preferably $0.5 \times 45 = 22.5$ lbs.—in.$^2$ The permissible moment of inertia of the oscillatory system thus varies with the torque capacity for which the gear is designed. The inertia must be low enough to enable the oscillating system to have the required frequency with a suitable spring and to ensure that the weights can force the oscillating system into substantial synchronization with their own frequency during "first phase" particularly at the period just before "second phase" is entered. The standard "Austin 7" H. P. engine develops about 22 ft.—lbs. torque and the inertia of the oscillating system of a gear for this power having a lowest fourth phase speed at full throttle at 1140 is preferably about 16.5 lbs.—in.$^2$ With an engine developing twice this torque it is permissible to employ a system having twice the inertia but this is not necessary as certain parts (e. g. bearings) do not require to be twice as heavy to carry twice the load, and it is therefore easier to keep within the permissible inertia limit with an engine of greater power. The permissible inertia of the oscillating system also depends on the natural frequency of this system, and on the ratio between the sun wheel and pinions which effects the frequency obtaining in first phase. If the natural frequency is increased the second phase action will commence at a lower tail shaft speed so that the maximum inertial resistance against entering second phase will be reduced but this frequency must not be too high or other difficulties arise. Also if the frequency in first phase is decreased said maximum inertial resistance is reduced but this frequency must not be reduced too much or other difficulties arise.

The lower the inertia the better will the gear function and the less difficulty will the design of a suitable spring shaft and other parts present. It is not practically feasible to reduce the inertia more than is desirable for the functioning of the gear since a certain inertia is necessitated by the strength and durability required for the various parts.

The inertia can be reduced to the required limits by making the parts concerned as small as permissible in weight and near to the axis of the gear, and by suitably designing the planetary weights. The weights may be fixed to their spindles and made at least twice as long as their diameter and preferably longer so that the centre of gravity is as near as possible to the axis of the associated pinion and the mass of the weight is concentrated or as close as possible to an axis through its centre of gravity. The result of this is to reduce the inertia of the weight about its centre of gravity and about the axis of the pinion without reducing its torque about the axis of the pinion. The length of the weight is preferably three times or more as great as its greatest distance from the pinion axis. The length will be limited mainly by the overall length reasonably permissible for the mechanism. The cross-sectional shape of the weight may be circular and the axis of the pinion may be on or near its circumference. The weight may, however, be reduced in size on one side adjacent to the axis or built up in places for strength. Alternatively, each of the weights is mounted directly and freely on a cylindrical bearing which is disposed eccentrically in relation to the axis of the associated pinion. The result of this is that, the centrifugal force remaining the same, the inertia of the weight will be reduced because it will not tend to make any rapid change in speed of rotation about its centre of gravity or normal centre of rotation. The inertia of the weight may be regarded in two ways, i. e. in relation to the rotation of its centre of gravity about the axis of the pinion and in relation to the rotation of the weight about its centre of gravity. The inertia of the weight about the other centre is considerably reduced. Further owing to the great reduction in the inertia about its centre of gravity the other inertia can be relatively decreased by an increase in size of the weight whereas if the inertia about its centre of gravity where not eliminated or greatly reduced such increase in size would not result in an advantage as far as inertia is concerned.

The lowest tail shaft speed at which the gear can enter second phase is determined largely by the natural frequency of the oscillating system referred to, and can also be varied by other means such as the weight of the planetary masses and the inertia of the oscillating system. This lowest speed should be arranged to be as low as possible without falling below or much below maximum torque speed so that inertia is as low as possible when entering "second phase". The lowest second phase tail shaft and engine speeds and the lowest top gear or fourth phase speed, must all be correlated to each other (without upsetting the other features of the invention) in such a manner that an undesirably large change in engine speed or gear ratio will not occur on entering or leaving top gear or fourth phase. These lowest speeds are mainly controlled by the size and disposition of the planetary weights, and the said natural frequency, but these factors in turn are controlled mainly by the maximum permissible inertia figure.

The maximum inertia figure can also be deduced from the natural frequency and spring stiffness. If the natural frequency of a resilient weighted system is known, the inertia can be deduced from known formulæ relating frequency to inertia and spring stiffness.

The resilient device preferably comprises one or more spring shafts each of which (1) is twisted about an axis passing longitudinally therethrough: (2) has its mass arranged sufficiently close to the axis as to reduce the inertia to the required figure; (3) is capable of enabling a natural frequency of the oscillating system of from 2000 to 2800 (or in special cases 1600 to 3200) to be produced; (4) is made of suitably flexible steel; and (5) is capable of flexing 50–70° each way according to the frequency without reaching the fatigue limit of the steel.

For characteristics (2) and (3) it will be apparent from the preceding explanation what inertia is permissible.

With regard to the characteristic (4) an alloy steel should be used for the shaft having a high resistance to fatigue when subjected to reversed torsional stresses. For example, a nickel chrome molybdenum steel heat treated to give an ultimate strength of 90–100 tons per sq. inch. A chrome vanadium steel has also given good results.

For the purpose of characteristic (5) the stress should preferably be maintained within about 20 tons per square inch and the spring must withstand the rapid reversals of stress to which it will be subjected for at least the normal life required for the parts of the gear. The spring will require to be long enough to reduce the stress to within the required limits without increasing the inertia too much. The shaft must be of the necessary stiffness to produce the desired frequency. The frequency chosen for the oscillating system will determine the maximum amplitude of twist of the spring shaft. A frequency of 2000 per minute will require up to about 70° maximum twist each way whereas a frequency of 2800 would require only about 50°–55°. A frequency of 2400 requires about 60° twist.

The twisting moment, stress, size, maximum deflection, and elastic modulus, are related by known formulæ.

In order that the said invention may be clearly understood and readily carried into effect the same will now be described more fully with reference to the accompanying drawings in which:—

Figure 1 is a central section of the main part of a gear made in accordance with the invention;

Figure 2 is a central section of the rear end of the gear shown in Figure 1;

Figures 3, 4, 5 and 6 are sections on the lines 3—3, 4—4, 5—5, 6—6 on Figures 1, 5, 6 and 5, respectively;

Figures 7, 7a, and 8 illustrate graphically the results of certain tests carried out with a different design of gear also made in accordance with the invention;

Figure 9 is an end view of one of the planetary weights shown in Figure 1;

Figure 10 illustrates a different design of planetary weight.

In Figure 1, A is the flywheel attached to the engine crank shaft and connected by universal joint $A^1$ to a short tubular shaft $A^2$ splined to a disc or spider $A^3$ linked by four pairs of links $A^4$ to the casing $A^5$ in which four planetary weights $A^6$ comprising a single set of weights are rotatably mounted on cranked spindles $A^7$ carried in roller bearings $a^6$ in the casing $A^5$. Each weight $A^6$ is shaped as shown in Figures 1 and 9. The weights are of long shape in relation to their distance from the axis of the spindles $A^7$. The casing $A^5$ is held in position axially by engagement of the bearing races of bearing $a^{50}$ between a shoulder $a^{51}$ on the casing on one side and a nut $a^{52}$ and lock washer $a^{53}$ on the other side. Each weight is geared by a pinion $b$ to the sun wheel B that is attached to the tubular intermediate shaft C. The pinions are enclosed in an oil chamber formed in the casing $A^5$ by partitions $A^{50}$ and $A^{51}$. The tubular intermediate shaft extends forwardly of the sun wheel into proximity with the flywheel A. Located within and attached to the front end of the intermediate shaft is the solid spring shaft D of circular cross-section. The spring shaft D has a force fit in the front end of the intermediate shaft and is held against rotary movement within the intermediate shaft at the front end by pins $C^1$. The shaft $A^2$ runs in bearings $a^2$ and a tubular extension $a^5$ of the casing $A^5$ runs between a Babbitt metal bearing outside and plain bearings $C^2$ inside. The other side of the casing runs between bearings $a^{50}$ outside and plain bearings $C^2$ inside. The outer casing H has a frusto-spherical joint $H^1$ with the engine casing E. Splined to the intermediate shaft C is the inner annular member F of a reversible roller detent device the outer annular member or race $F^1$ of which is provided with radially extending lugs $F^2$ (Figure 5) bolted to a plate $H^2$ comprising part of the outer casing H. The inner member has oil holes $F^{16}$. The outer race $F^1$ is provided with curvatures in the usual way. Between each pair of the rollers $F^3$ is a pin $F^9$ carrying two pivoted plates $F^{10}$ one of which engages one of the adjacent pair of rollers and the other of which engages the other of the adjacent pair of rollers. A coil spring (not shown) surrounding the pin presses the plates apart and thus the rollers also. The pins referred to are mounted in two plates $F^4$ provided with lugs $F^5$ bolted together. The inner detent member or race F is positioned between a spring ring $F^6$ on one side and a nut $F^7$ and lock washer $F^8$ on the other side. One of the lugs $F^5$ is attached by pin and slot connection $F^{15}$ to a sleeve $f$ fixed to a piston rod $f^1$ that carries a piston $f^2$ operating in a cylinder $f^3$ formed in the outer casing H. The piston $f^2$ has an annular groove $f^4$ in its outer surface midway between the ends of the piston and on each side of this groove are two inlet ports $f^5$, $f^6$ (for forward and reverse drive respectively) leading to opposite sides of the piston. Also on opposite sides of the groove $f^4$ are outlet ports $f^7$, $f^8$ (see Figure 4). In the mid-position of the piston $f^2$ oil under pressure enters from an inlet port $f^{10}$ and passes through the groove $f^4$ to an outlet port $f^9$. Displacement of the piston to one side or the other will enable oil from $f^{10}$ to enter the cylinder on one side or the other of the piston through the ports $f^5$ or $f^6$ and to move or press the piston $f^2$ whereby the pressure on the rollers is increased or decreased, the oil leaving through the ports $f^7$ or $f^8$. The port $f^{10}$ leads to two nipples $f^{31}$ and $f^{32}$ (Figure 6), the former of which leads to a pump (not shown) driven by connection to the engine and the other of which ($f^{32}$) leads to a pump $f^{11}$ (Figure 3) driven by connection to the spring shaft $D^4$ through a worm $F^{11}$ and worm wheel $F^{12}$. The pump $f^{11}$ removes the oil from the nipples whilst the other pump supplies oil to the nipples. The pressure of the oil entering through the port $f^{10}$ is thus equal to the difference in pressure of oil from the two pumps. An oil reservoir $f^{12}$ is provided adjacent to the cylinder $f^3$ and has ports $f^{13}$, $f^{14}$ communicating with the cylinder to maintain the cylinder filled and to permit escape of oil from the cylinder when necessary. Another outlet port $f^{15}$ in the reservoir $f^{12}$ at the upper end thereof and above the cylinder $f^3$ is provided for the purpose of supplying oil to the gear generally. The cylinder $f^3$ may have an air escape for use when the cylinder is being filled initially. The rod $f^1$ is connected with lost motion to a hand operated control (not shown). The hand control is used for placing one of the ports $f^5$ or $f^6$ into communication with $f^{10}$ on starting for forward or reverse running. Oil escaping through the outlet port $f^9$ passes through a pipe $f^{20}$ into a chamber $f^{21}$ surrounding the spring shaft D,D$^4$ at the part where the shaft leaves the roller detent rearwardly. The chamber $f^{21}$ also receives oil leaving the pump $f^{11}$. A relief valve $f^{34}$ in the chamber $f^{21}$ is connected to the nipple $f^{31}$. The chamber $f^{21}$ has two "Gits" oil seals $f^{22}$, $f^{23}$, thereby leaving an outlet for the oil from the chamber $f^{21}$ into the interior of the intermediate shaft on one side and to a less extent by leakage through bearings for lubricating certain parts hereinafter to be described. The oil leaves the interior of the intermediate shaft through various lubricating holes $f^{25}$ for lubricating various parts of the gear. An oil seal may also be situated between the engine casing E and the flywheel A.

The spring shaft D is fixed at its rear end by force fit and pins $d$ to a flexible tubular shaft D$^4$, made in sections attached together at intervals by sleeves $d^4$ to which the adjacent ends of the sections are splined. The adjacent ends of the sections also run on split bearing sleeves D$^5$. The sleeves $d^4$ run in bearings $d^{40}$ carried by an outer rigid tube D$^6$. The front end of the flexible tube D$^4$ is splined to the front end of the rigid tube D$^6$. The rear end of the flexible tube D$^4$ runs in a bearing collar D$^8$ of the rigid tube D$^6$. The tubular extension D$^8$ carries a stub shaft D$^9$ on which a bevel pinion D$^{10}$ operating the differential gear is mounted. The rigid tube D$^6$ runs between a bearing D$^{12}$ at its forward end and two bearings D$^{13}$, D$^{14}$ at its rear end. A fly wheel J is attached to the rear end of the rigid tube D$^6$. The spring shaft D may also if desired be made in two or more sections joined together in a manner similar to that described with reference to the sections of the flexible tube D$^4$.

The casing H is rigidly attached to the differential housing H$^5$ by a torque tube H$^4$ that surrounds the parts D, D$^4$, D$^6$. The weight and stiffness of the tube H$^4$ and casing H is arranged so that they have a natural frequency of vibration different from the frequencies of the gear itself.

Figure 10 illustrates a different type of planetary weight comprising a ring A$^{60}$ having an internal circular bearing surface. A spindle A$^{70}$ carrying the ring has shoulders to locate needle bearings A$^{71}$ between the ring and the spindle. This weight as it is free to rotate about its spindle (wherein it differs from the weight shown in Figure 1) will not tend to make any rapid change in speed of rotation about its centre of gravity or normal centre of rotation. The inertia effect of these weights on the oscillating system will therefore be considerably reduced.

The rear end of the engine casing is mounted on an annular rubber support K.

The gear so far described with reference to Figures 1 to 6 was designed for a standard "Rover 10" motor-car (1933 model) weighing about 22 cwt. and having an engine of about 45 ft.—lbs maximum torque. The gear has a frequency of 2900. The length of the spring shaft D is about 69.5 inches and the diameter of the inner member of the roller detent is 3.806 inches. These figures are drawn to scale so that the weight and size of the various parts can be ascertained by comparison with the above mentioned dimensions.

Figure 7 illustrates graphically the results of certain bench tests carried out with a gear applied to a standard "Austin 7" engine.

The parts of the curves from 0 to 700 dynamometer (tail-shaft) R. P. M. represent first phase action. Second phase action is from 700 to about 2100 and the frequency (see curve A) remains at about 2700 over this second phase. At about 2500 the frequency drops to about half the phase two frequency. The graphs may not be precisely accurate due to the fact that more precise recording instruments were not available. Curve B shows the steady increase in engine R. P. M. during phase two; the required reduction of engine speed on entering phase three. Curve C shows the direct drive which in that particular gear could be entered at any time above about 1,140 tail shaft R. P. M. Curve D shows the even variation of gear action. It will be observed that the curve C should not be low enough to permit change into or out of direct drive (fourth phase) on the steep part of the gear ratio curve, and the lowest engine and tail shaft speed on curve B must be so arranged with respect to the lowest speed on curve C that on changing into or out of direct drive there will not occur a too large change in engine speed or gear ratio. Curves F and G show the positive and negative spring torques respectively, and indicate the increasing spring torque in phase two and absence of negative torque in phase one. Curve H illustrates the torques produced by the rotary weights.

Figure 7a shows the same curves B and C as in Figure 7, but extended. The full line curve B was prepared throughout at full throttle and full load. Thus the point B$^1$ was obtained by driving a load heavy enough to keep the engine and tailshaft speeds constant. Thereafter the load was lightened slightly and the curve advanced to B$^2$, i. e., the tailshaft speed increased and engine speed decreased. The load was thus continually reduced step by step until at B$^4$, where approximately the engine torque is at its maximum, second phase is entered. The curve B continues until at point B$^3$ the curve drops suddenly and from B$^5$ to B$^6$ third phase occurs, and from B$^6$ to B$^7$ fifth phase occurs. At the point B$^7$ fourth phase is entered. This curve does not of course indicate the sort of curve that will normally occur in driving a motor vehicle. In normal driving the curve in first phase can vary anywhere between O–B$^4$ to $b$–B$^4$, e. g., $b^2$–B$^4$ or $b^3$–B$^4$ but more usually about $b^1$ to B$^4$. The point B$^4$ however for a given gear is unalterable for full throttle. In normal driving, the third phase curve can extend down to B$^9$ and the top gear (fourth phase) curve can extend down to C$^1$—B$^8$, B$^9$, C$^1$, being in the same vertical straight line. In normal driving the driver does not usually allow the gear to go right through the second phase curve up to B$^3$ but by a momentary partial closing of the throttle the gear can be caused to leave second phase action at any point between B$^8$ and B$^3$ and to enter third phase or fourth, and at any time in third phase the driver can similarly put the gear into fourth phase. A normal sort of curve would be $b^1$–B$^4$–B$^8$–B$^{10}$–B$^{11}$–B$^{12}$–C$^2$ (or say, $b^1$–B$^4$–B$^{13}$–C$^3$) and then continue in fourth phase. The engine speed is thus normally maintained within a narrow range not falling below maximum torque. Certainly at full throttle in second and third phase the engine cannot in any circumstances get below maximum torque speed. At less than full throttle it is of course not objectionable for the engine to run at less than maximum torque speed since maximum torque is not required. It is to be observed that the top gear curve extends down far below maximum torque speed, and whilst this is theoretically undesirable, it is a feature which is desired by the motoring public. The reason for the sudden increase of engine speed on entering second phase is that the frequency of impulses from the weights remains constant at the natural frequency of the spring system. Now $F=R(E-T)$, where F=frequency, R=sun and pinion ratio, E=engine speed and T=tailshaft speed. Therefore since F and R are constant in second phase $(E-T)$ is constant and E must therefore increase with increase of tailshaft speed.

The point $B^4$ occurs when alternate positive and negative amplitude occurs in the spring shaft and this can only occur (if inertia of the intermediate means and the size of the weights is satisfactory) at about 600–700 revolutions of the tailshaft. Thus change of natural frequency or sunwheel and pinions ratio will not move the point $B^4$ very much horizontally at full throttle and accordingly frequency and ratio can be selected to give the desired lowest second phase engine speed at full throttle.

Figure 8 illustrates graphically the result of varying inertia of the oscillating system and of increasing the natural frequency of the system. Graphs X, Y, and Z, are frequency curves and graphs $X^1$, $Y^1$, and $Z^1$, are engine speed curves corresponding respectively to the curves X, Y, and Z. Graphs X, $X^1$, are of the frequency and engine speed respectively and the part $x^1$ of the graph $X^1$ shows the sudden reduction in engine speed causing a certain amount of roughness when the gear is entering second phase due to the inertia being too great. When the inertia was lightened (the natural frequency being kept at the same value by altering the spring stiffness) as shown by the graphs Y, $Y^1$, the roughness was very much reduced. Increase of natural frequency (together with lightened inertia) as shown by the curves Z, $Z^1$ avoided this roughness altogether.

The point $B^4$ and other parts of the curves can be altered by varying the factors hereinbefore described, viz., (1) natural frequency, (2) weight of the planetary weights, (3) ratio of sunwheel and pinions, and (4) moment of inertia affecting the oscillation of the sunwheel. Movement of the point $B^4$ vertically is accompanied by movement of the whole of the engine speed curves (except to gear).

(1) If frequency is raised (by varying the moment of inertia or the stiffness of the spring system) it is found as can be seen from Figure 8 that the point $B^4$ will be raised and moved slightly to the left with corresponding variation of transmission ratios and vice versa. If the frequency is reduced by using a less stiff spring the spring itself must be made longer (since it will have a greater amplitude) in order that it may not be stressed beyond the permissible limit. Thus frequency cannot be made too low or the spring shaft will become too long for the vehicle or other apparatus. Variation of frequency is therefore limited mainly by the known range of required transmission ratios and also by the roughness difficulty and length of spring.

(2) If the moment of inertia is increased and the spring stiffness is unaltered the point $B^4$ is displaced slightly to the right and lowered and the roughness difficulty increases and the natural frequency is reduced so that the range of transmission ratios becomes too low. The lowest moment of inertia is mainly limited by the required strength of parts. The planetary weights are designed to have low inertia effect.

(3) If the sun and pinion ratio is increased the point $B^4$ is displaced to the right and lowered and the range of transmission ratios is correspondingly decreased. Conversely if this ratio is decreased the engine speed and transmission ratios are increased. This ratio is therefore fixed within comparatively narrow limits for any particular engine and apparatus driven thereby.

(4) Increase of size of weights (if inertia is unaltered) moves the point $B^4$ to the left and reduces the lowest top gear speed at full throttle and increases the load on the bearings so that larger bearings must be used with increase of moment of inertia and reduction of frequency. The size of the weights is mainly limited by this required lowest top gear speed, but as already mentioned the weights must then be designed to have low inertia effect on the spring system.

Various other kinds of spring shaft may be provided such as a number of square rods or flat leaves.

The invention is more particularly applicable to motor propelled road vehicles but can also be applied to hauling and lifting apparatus such as capstans, winches, elevators, bridge lifting mechanism, cranes, jacking apparatus, and testing machines, and to presses such as bending, pressing or moulding machines or rolling mills, and to Diesel driven and similar locomotives, launches, and to various other devices including pumps, and rock drills. The invention is applicable probably in any circumstances where it is desired that the driven member shall automatically be brought to rest by a given maximum load whilst the pressure is maintained and without stalling the prime mover. It is also applicable probably in any case where automatically varying torque or gear ratio is desirable. Various modifications will be desirable according to the application.

Where the gear is applied to apparatus not having a maximum torque speed, the equivalent speed will of course apply, e. g., for an electric-motor the minimum and maximum speeds for normal running will be regarded as the aforesaid maximum torque and maximum horse-power speeds respectively, or the said equivalent speed may be regarded for most purposes as about half the maximum speed for the electric-motor.

What I claim and desire to secure by Letters Patent of the United States is:

1. A power transmission mechanism comprising a driver shaft, a driven element, planet pinions carried by the driver shaft, at least one set of planetary weights carried by said planet pinions, a sun-gear meshing with said planet pinions, an intermediate rotary tubular shaft, means for preventing said intermediate tubular shaft rotating other than in a desired direction, said sun-gear being mounted on said intermediate tubular shaft, and a resilient device mounted within said intermediate tubular shaft and resiliently connecting said intermediate tubular shaft to said driven element.

2. A power transmission mechanism comprising a driver shaft, a driven element, planet pinions carried by the driver shaft, at least one set of planetary weights carried by said planet pinions, a sun-gear meshing with said planet pinions, an intermediate rotary tubular shaft, means for preventing said intermediate tubular shaft rotating other than in a desired direction, said sun-gear being mounted on said intermediate tubular shaft, a resilient device mounted within said intermediate tubular shaft, means connecting one end of said resilient device to one end of said intermediate tubular shaft, and means connecting the other end of said resilient device to said driven element.

3. A power transmission mechanism comprising a driver shaft, a driven element, planet pinions carried by the driver shaft, at least one set of planetary weights carried by said planet pinions, a sun-gear meshing with said planet pinions, an intermediate rotary tubular shaft, means for preventing said intermediate tubular shaft rotating other than in a desired direction, said sun-gear being mounted on said intermediate tubular shaft, and a resilient device for transmitting driving motion from said intermediate tubular shaft to the driven element, said resilient device comprising a spring shaft, a flexible tubular shaft surrounding the spring shaft, means connecting one end of said flexible tubular shaft to the spring shaft, a tube surrounding the flexible tubular shaft and extending beyond the connected ends of the spring shaft and flexible tubular shaft and means connecting the other end of said flexible tubular shaft to one end of said tube.

4. A power transmission mechanism comprising a driver shaft, a driven element, planet pinions carried by the driver shaft, at least one set of planetary weights carried by said planet pinions, a sun-gear meshing with said planet pinions, an intermediate rotary tubular shaft, means for preventing said intermediate tubular shaft rotating other than in a desired direction, said sun-gear being mounted on said intermediate tubular shaft, and a resilient device for transmitting driving motion from said intermediate tubular shaft to the driven element, said resilient device comprising a spring shaft, a flexible tubular shaft surrounding the spring shaft, means connecting one end of said flexible tubular shaft to the spring shaft, a stiff tube surrounding the flexible tubular shaft and extending beyond the connected ends of the spring shaft and flexible tubular shaft, means connecting the other end of said flexible tubular shaft to one end of said stiff tube and a fly-wheel mass mounted on said stiff tube.

5. A power transmission mechanism comprising a driver shaft, a driven element, planet pinions carried by the driver shaft, at least one set of planetary weights carried by said planet pinions, a sun-gear meshing with said planet pinions, an intermediate rotary tubular shaft, means for preventing said intermediate tubular shaft rotating other than in a desired direction, said sun-gear being mounted on said intermediate tubular shaft, and a resilient device for transmitting driving motion from said intermediate tubular shaft to the driven element, said resilient device comprising a spring shaft, a flexible tubular shaft surrounding said spring shaft, said flexible tubular shaft being formed of sections and spline means connecting the adjacent ends of said sections together to provide for lengthening of the composite flexible tubular shaft during twisting.

HOWARD FREDERICK HOBBS.